INVENTOR
JACOB MILLMAN
ATTORNEYS

United States Patent Office 2,725,553
Patented Nov. 29, 1955

2,725,553

COORDINATION CIRCUIT

Jacob Millman, Flushing, N. Y., assignor, by mesne assignments, to the United States of America as represented by the Secretary of the Navy Original application January 15, 1946, Serial No. 641,335, now Patent No. 2,605,408, dated July 29, 1952. Divided and this application April 24, 1952, Serial No. 284,011

7 Claims. (Cl. 343—6.5)

This invention relates to electric synchronizers and more particularly to a circuit for deriving an electric pulse of a relatively low repetition rate from a high-periodicity recurrent-pulse signal and for timing each low repetition rate pulse to coincide with a pulse of the higher repetition rate.

This application is a division of copending application, Serial No. 641,335, filed January 15, 1946, now U. S. Patent No. 2,605,408, issued July 29, 1952, entitled "Coordination Circuit."

The multivibrator is commonly employed as a timing device wherein the signal output of the multivibrator is of a repetition rate which is a submultiple of the repetition rate of an input synchronizing or timing signal. Inherently, therefore, the multivibrator is limited in its function as a timer or frequency divider to applications involving integral repetition rates.

The present invention overcomes this limitation and provides a circuit for generating an electric pulse signal of a relatively low repetition rate that is nonintegral with a pulse of higher repetition rate from which it is derived.

An object of this invention is to provide a circuit which acts as a frequency divider and derives an electric pulse of a nonintegral and relatively low repetition rate from a pulse of a higher repetition rate.

Another object is to provide a circuit for synchronizing each pulse of a signal of a relatively low average repetition rate to a pulse of a signal of a relatively high and nonintegral repetition rate.

A further object is to provide a synchronizer in which a control signal of relatively low frequency is combined with a pulse signal of a high and nonintegral repetition rate so that there is a resultant output pulse signal having an average repetition rate equal to the control frequency and each pulse of which is synchronous with a pulse of the higher repetition rate signal.

These and other objects and features of this invention will become apparent upon a consideration of the following detailed description when taken together with the accompanying drawings, the figures of which illustrate a typical embodiment of this invention.

Figure 1:
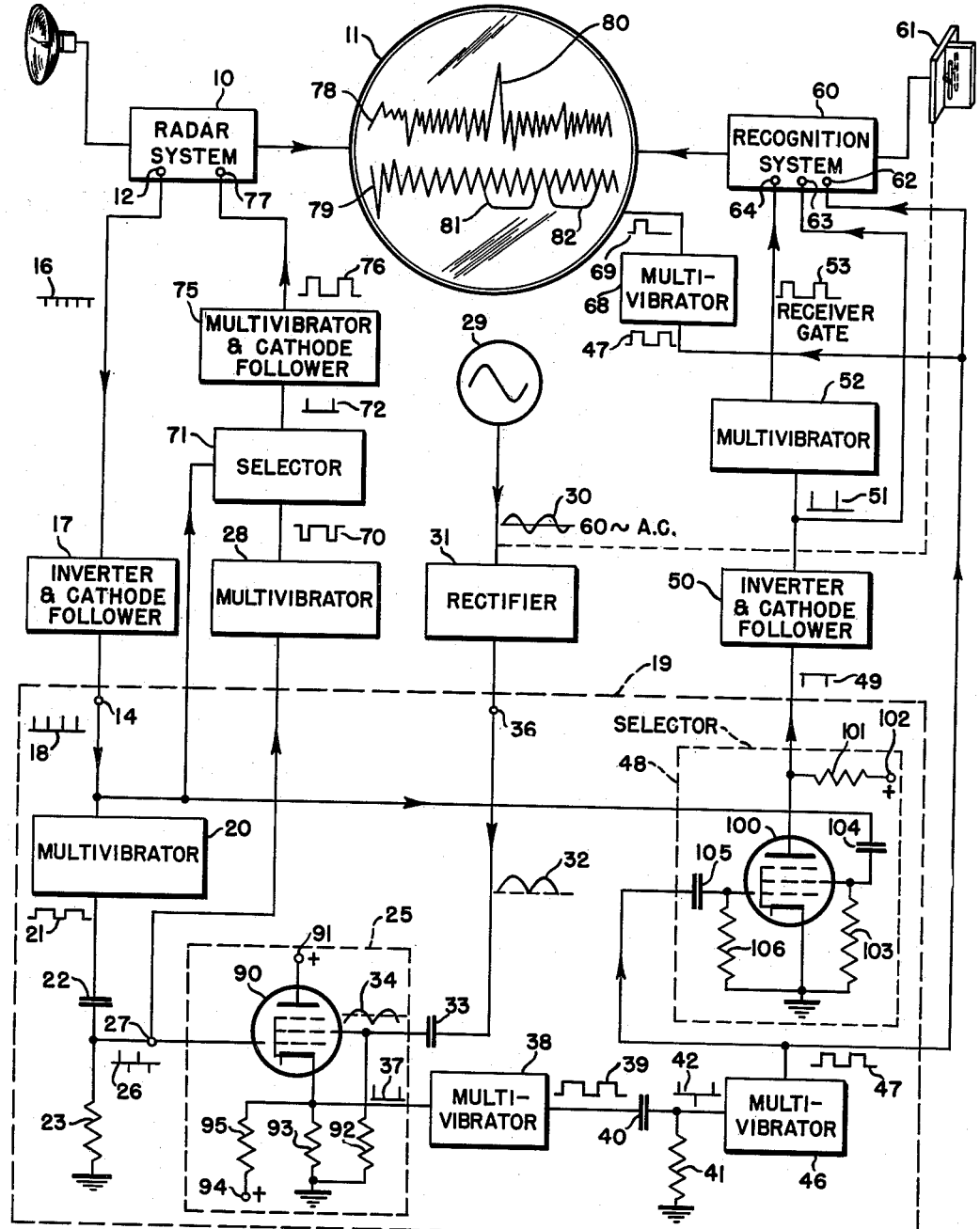
Figure 2:
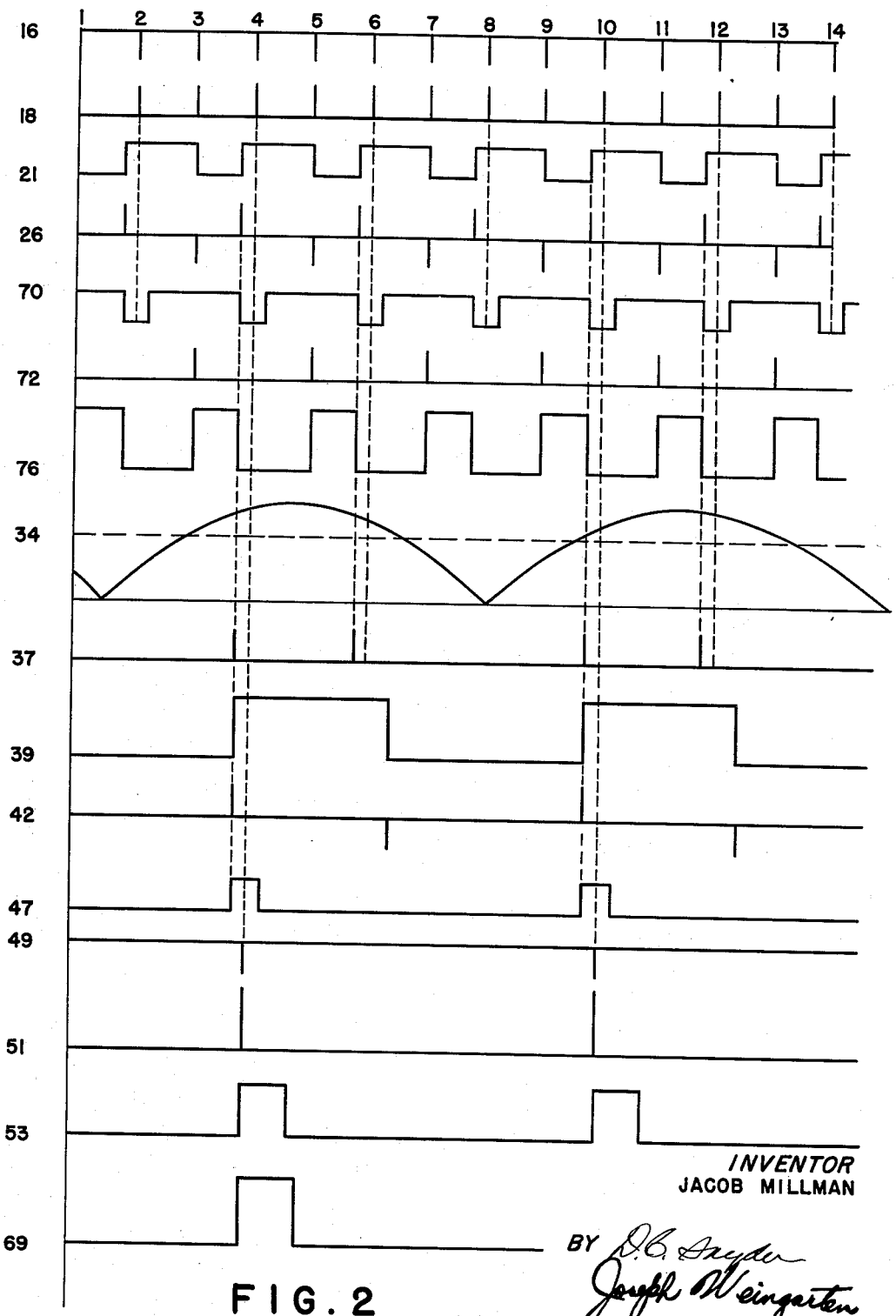

Fig. 1 is a block diagram of a radar system and a cooperating recognition system together with a system for coordinating their operation, including a synchronizer or frequency divider according to this invention; and Fig. 2 illustrates the wave forms at various points of the circuit of Fig. 1 as a function of time.

The illustrative use of this invention as shown in Figs. 1 and 2 relates to a radar system having an "A-scope" indicator type of presentation on which the radar output gives a positive deflection, the position of the deflection along the base line being proportional to range. Recognition signals are also displayed on the A-scope with a negative deflection on a horizontal sweep which is vertically displaced from the radar sweep so that confusion is avoided. The recognition system includes an interrogating transmitter and a receiver for reception of recognition signals from friendly targets having equipment responding to the interrogating signals. The antenna beam of the recognition system is broader than that of the radar system. To provide the necessary directivity for the recognition antenna and unmistakable association of radar target and recognition signals, the recognition antenna beam is lobe switched, the echoes returned for each of the two lobes being horizontally displaced on the A-scope and their amplitudes matched as an index of the centering of the beam on the target under which the first recognition echo appears.

In this illustrative embodiment of the invention, the horizontal sweeps for the A-scope are generated by the radar system, operating at a repetition frequency of 800 pulses per second. The recognition system operates from a source of 60 cycle current, has a lobe switching frequency of 60 cycles and interrogates, therefore, at a rate of 120 pulses per second. The synchronizer of this invention is the heart of the coordination system and utilizes a full-wave rectified 60 cycle wave or a 120 cycle control frequency, during each cycle of which one trigger out of the series of radar modulator pulses is selected to trigger the interrogator. Simultaneously, the other units, of the coordinating system provide blanking for the radar receiver, unblanking of the recognition receiver, and vertical displacement of the horizontal sweep on the A-scope in order to set apart the recognition display trace from that of the radar system. Also, on alternate interrogator pulses, the A-scope sweep is displaced horizontally so that the signal return from each lobe of the recognition system antenna beam may be seen separately for matching of amplitudes.

Referring to Figs. 1 and 2, radar system 10 includes the conventional units, a transmitter with pulse modulator, receiver, antenna, horizontal sweep generator, and the A-scope type cathode ray tube indicator 11. From terminal 12, the modulator of radar system 10 supplies a series of negative triggers 16 to unit 17, comprising inverter and cathode follower stages. Positive triggers 18 are produced at the output of unit 17 and supplied to synchronizer unit 19. Synchronizer 19 receives triggers 18 which are the high-periodicity recurrent pulse signal input derived from radar system 10, at a first input circuit connected to terminal 14. The signal at terminal 14 will be referred to hereafter as the "input signal." The multivibrator of unit 20 is a conventional two-to-one divider completing one cycle and starting another of square wave 21 when triggered by every other pulse of output 18. Square wave 21 is differentiated by capacitor 22 and resistor 23 in series to ground and the resultant output 26, with alternate positive and negative triggers, appears at terminal 27. From terminal 27, triggers 26 are supplied to selector 25 and also to unit 28 which will be described later.

Synchronizer 19 has a second input circuit connected to terminal 36 to which is supplied a periodic control signal hereafter referred to as the "control signal," having a periodicity substantially lower than the "input signal" applied to terminal 14. Power source 29 supplies 60 cycle A. C. current shown in wave 30 which is full-wave rectified by rectifier 31. The output of rectifier 31 is the 120 cycle wave 32 which is applied to terminal 36 and coupled through capacitor 33, where it loses its D. C. component as shown in wave 34, thereafter being supplied to selector 25.

Selector 25 comprises vacuum tube repeater means for combining the "input signal" and the "control signal" and for repeating or translating only a portion of the combined signals. It will be described in greater detail hereinafter, but briefly, it includes a pentode having wave 34 applied to its screen grid and triggers 26 applied to its control grid. The output is taken from the cathode circuit and reproduces only those few positive triggers of wave 26 which occur during each cycle of wave 34 when the screen grid of the tube of selector 25 is also positive. The output of selector 25 is wave 37, whose first trigger during each cycle of wave 34 is selected to trigger a pulse-responsive means comprising multivibrator 38. The square wave output 39 of multivibrator 38 is a recurrent-pulse signal which is differentiated by capacitor 40 and resistor 41 connected in series to ground, wave 42 appearing at their junction with alternately positive and negative triggers. Multivibrator 46 is triggered by the positive triggers only of wave 42 and generates square wave 47. Square wave 47 is applied to the control grid of the pentode of selector 48 and positive triggers 18 are applied to the screen grid of the pentode of selector 48 through coupling condenser 104. The resultant output negative triggers 49 are applied to unit 50, comprising inverter and cathode follower stages, whose output is wave 51. Each pulse of wave 51 triggers multivibrator 52, generating square wave 53.

Square wave 47, trigger wave 51, and square wave 53 also constitute blanking and unblanking gates and triggers for coordinating the operation of recognition system 60 with radar system 10. Recognition system 60 includes an interrogating transmitter, a receiver for reply signals from equipment responding to the interrogator, a separate receiver and responding transmitter for replying to other interrogators, and a lobe switching antenna system 61 for the interrogator and its receiver. Square wave 47 is applied to terminal 62 to blank the receiver for the responding transmitter so that it will not be triggered by its own interrogator. Square wave 47 is also supplied to multivibrator 68 whose output square wave 69 is applied to displace horizontally alternate sweep traces of the recognition display on A-scope 11. Positive trigger 51 is applied to terminal 63 to trigger the interrogating transmitter. Square wave 53 is applied to terminal 64 to unblank the receiver for reply signals from equipment responding to the interrogator. The dotted line between antenna 61 and 60 cycle A. C. source 29 indicates that source 29 controls the 60 cycle lobe switching of the antenna beam.

Returning to multivibrator 28, it is triggered by the positive triggers of wave 26 and supplies a negative gate 70 to the control grid of the pentode of selector 71 whose constitution is similar to that of selector 48. Positive triggers 18 are supplied to the screen grid of the pentode of selector 71, whose output wave 72 triggers unit 75, comprising multivibrator and cathode follower stages, supplying square wave 76 to terminal 77 of radar system 10 to blank the radar system "off" when recognition system 60 is operating. On the face of A-scope 11 as shown in Fig. 1, 78 is the radar trace and 79 is the recognition trace. Positive pip 80 is the echo of a target responding to interrogation. The negative pips 81 and 82 are the amplitude matched pips of the recognition signals in each lobe of the recognition antenna system 61, with the first pip 81 coming directly under the target 80 which it identifies.

Selector 25 comprises pentode tube 90, a source of plate potential connected at terminal 91, screen resistor 92 connected at one end to ground, cathode resistor 93 similarly connected to ground, and a source of positive cathode bias connected at terminal 94 and coupled through resistor 95 to the cathode. Terminal 27 ties to the control grid of tube 90. The 120 cycle wave 32 is coupled to the screen grid of tube 90 through capacitor 33. The output from selector 25 is taken from the cathode of tube 90 to trigger multivibrator 38. Selector 48 comprises pentode tube 100, plate resistor 101 coupling the plate to a source of plate potential connected at terminal 102, screen resistor 103 coupling the screen to the ground, capacitor 104 coupling wave 18 to the screen grid, capacitor 105 coupling the output of multivibrator 46 to control grid, and grid leak resistor 106 connected between control grid and ground. The cathode of tube 100 is grounded and output wave 49 is taken from its plate.

In Fig. 2 are shown the wave forms at various points of the circuit of Fig. 1 in their proper time relationships. By reference to these wave forms and the circuit of Fig. 1, the operation of the system for coordinating the radar and recognition systems will be readily understood.

The modulator of radar system 10 supplies a negative trigger wave 16 with a repetition frequency of 800 per second. This trigger 16 is synchronous with the pulsing of the radar transmitter and the start of each horizontal sweep of A-scope 11. From trigger 16 is to be derived, by synchronizer 19, the trigger 51 for pulsing the interrogating transmitter of recognition system 60 at a repetition frequency of 120 per second. The individual triggers of the wave 16 are numbered from 1 to 14 for fixing time relationships of the chain of wave forms in the circuit of Fig. 1. Unit 17 takes each negative trigger 16 from the modulator and inverts it to supply positive trigger 18 to multivibrator 20. Each trailing edge of square wave 21 is coincident with an odd numbered trigger of wave 18, starting with trigger 1. The constants of multivibrator 20 are such that the leading edges of square wave 21 each precede the even numbered triggers of wave 18. Square wave 21 is differentiated by capacitor 22 and resistor 23 to produce trigger wave 26, having negative triggers coincident with the odd triggers of wave 18 and positive triggers preceding the even triggers of wave 18. Multivibrator 28 responds only to the positive triggers of 26 and provides a negative gate 70 which is then centered about the even triggers of wave 18. Selector 71 is a pentode biased to zero grid voltage and has negative gate 70 applied to its control grid and wave 18 applied to its screen grid. All even numbered triggers of wave 18 are rejected because the control grid is negative when they appear on the screen grid and hence only odd numbered triggers appear in output wave 72. Block 75 is triggered by each pulse of wave 72, generating square wave 76 whose positive gate unblanks the receiver of radar system 10. Thus, the radar display appears on A-scope 11 following odd numbered triggers of wave 18 and at a repetition rate of 400 cycles.

The even numbered triggers of wave 18 are reserved for triggering recognition system 60 according to the control frequency of 60 cycle A. C. source 29. Rectified 60 cycle wave 32 has its D. C. component removed by capacitor 33 as shown by wave 34, where the dashed line is the D. C. level. Wave 34 is applied to the screen grid of pentode 90 of selector 25, whose control grid receives wave 26. Pentode 90 is biased to cut-off and conducts only when the control and screen grids are driven positive simultaneously. Output wave 37 of selector 25 corresponds to all even numbered pulses of wave 18, since the positive pulses of wave 26 are all even numbered. It will be noted that each trigger of wave 37 precedes the corresponding trigger of wave 18 by the amount established by multivibrator 20 in generating square wave 21. Also, for each half cycle of the 60 cycle supply, or each cycle of wave 34, there are either one or two triggers in wave 37. Unit 38 is a multivibrator which is triggered by the first trigger of wave 37 that appears at its input to initiate a pulse of a recurrent-pulse signal, square wave 39. The positive gate or width of the resulting square wave 39 is adjusted to extend beyond the next trigger of 37 if there should be a second one in any cycle of wave 34, as shown. Thus multivibrator 38 is rendered unresponsive to all but the selected first appearing trigger of wave 37. Square wave 39 after differentiation by capacitor 40 and resistor 41 becomes trigger wave 42. Multivibrator 46 responds only to the positive pulses of wave 42 and its output square wave 47 has a positive gate which is centered about one even numbered trigger of wave 18 for each cycle of 120 cycle wave 34.

Selector 48 contains another selector pentode 100 which is biased to cut-off. Square wave 47 is fed to its control grid and triggers 18 to its screen grid. Only a trigger of wave 18 which occurs during the positive gate of square wave 47 will result in an output from pentode 100, as shown in wave 49, and this output will correspond in time to one even numbered trigger of wave 18 during each cycle of 120 cycle control wave 34. Thus a trigger 51 is provided for the interrogating transmitter of recognition system 60 by inverting trigger 49 in unit 50.

The derivation of trigger 51 from trigger 18 demonstrates how this invention provides for the derivation of an electric pulse of a low repetition rate from a pulse of a high repetition rate. It will be noted also that although triggers 51 and 18 are of nonintegral repetition frequencies, each trigger of 51 coincides with a trigger of the higher repetition rate trigger 18 and, in this sense, synchronism is achieved.

Simultaneously with the triggering of the interrogator of recognition system 60, trigger 51 triggers multivibrator 52 to generate square wave 53 which is applied to terminal 64 of recognition system 60 to provide an unblanking gate for its interrogator receiver. To provide the lobe switching displacement of the horizontal recognition trace on the A-scope 11, square wave 47 is supplied to multivibrator 68 which generates a gate 69 having half the repetition frequency of wave 47 and occurring at every other pulse of interrogator trigger 51. By the term gate as used in this specification is meant a voltage pulse used for gating or otherwise controlling the operation of a succeeding circuit. By applying this gate 69 to the cathode of the tube supplying the sweep of A-scope 11, alternate sweeps for the recognition trace are displaced horizontally, which is the desired presentation for lobe matching.

The resultant presentation on the face of A-scope 11 was described in connection with Fig. 1.

It will be noted that in addition to its primary function in this invention as a deriver of a pulse of low repetition frequency from a pulse of higher repetition frequency, synchronizer 19 provides gates and triggers for other functions in coordinating the operation of radar system 10 and recognition system 60. For example, multivibrator 20 is employed as a two-to-one divider to provide, among other things, for radar and recognition system sharing of A-scope 11 presentation on alternate triggers of wave 18. However, it is readily apparent that multivibrator 20, capacitor 22, and resistor 23 are not essential to this invention since triggers 18 could be applied directly to selector 25. Furthermore, the repetition rates of square wave 39, square wave 47 and trigger 51 are the same so that square wave 39 could be directly utilized as the derived low frequency signal according to this invention, the synchronizer then being further simplified by the elimination of capacitor 40, resistor 41, multivibrator 46, and selector 48.

From the foregoing description, it will be readily seen that this invention provides a circuit for deriving an electric pulse signal of nonintegral and relatively low repetition rate from a pulse signal of a higher repetition rate. Although there is shown and described only a certain specific embodiment of this invention in a coordination system, the many modifications possible thereof will be apparent to those skilled in the art. Therefore, this invention is not to be limited except in so far as is necessitated by the prior art and the spirit of the appended claims.

What is claimed is:

1. A coordination system for preventing interference between a radio pulse echo detection system and a cooperating lobe-switched antenna directional recognition system having at least one transmitter and one receiver using a common cathode ray indicator comprising, a source of voltage pulses having a known constant repetition rate, a frequency divider responsive to pulses from said source to produce two series of pulses, the pulses of the first of said series occurring in time coincidence with alternate pulses from said source, the pulses of the second of said series being spaced from pulses of said first series of pulses by a predetermined time interval, means to control the operation of said radio pulse echo detection system in response to pulses of the first of said series, a power source for switching said antenna lobes, means responsive to voltage from said power source and said second series of pulses to select one of said second series of pulses for each switching cycle, means to control the operation of said recognition system in response to each selected pulse from said second series, means responsive to pulses from said second series to render the receiver of said recognition system operative immediately following the time interval of operation of its transmitter, and means responsive to alternate selected pulses from said second series to displace horizontally the indication of said cathode ray indicator during alternate switching cycles of said lobe-switched antenna.

2. In a combined microwave radar search system and cooperating directive radio recognition system employing a common indicator, a circuit for coordinating and synchronizing the operation of the components of the combined system comprising an alternating current power source for switching the directivity of said recognition system, a source of voltage trigger pulses having a known constant repetition rate, means responsive to trigger pulses from said source to produce two series of pulses, pulses of the first of said series occurring in time coincidence with odd numbered trigger pulses from said source, pulses of the second of said series occurring a predetermined time interval before even numbered trigger pulses from said source, means to control the operation of said radar system from the first of said series of pulses, means for deriving a unidirectional cyclic control voltage from said alternating current power source, means responsive to the second of said series of pulses and to said cyclic control voltage to select a single pulse of said second series for each cycle of said control voltage, and means for controlling the operation of said recognition system from the selected pulse of said last-named selecting means.

3. In a combined microwave radar search system and cooperating directive radio recognition system employing a common indicator, a circuit for coordinating and synchronizing the operation of the components of the combined system comprising, an alternating current power source, means controlling the directivity of said recognition system from said power source, a source of voltage trigger pulses having a known constant repetition rate, means responsive to trigger pulses from said source to produce two series of pulses, pulses of the first of said series occurring in time coincidence with odd numbered trigger pulses from said source, pulses of the second of said series occurring a predetermined time interval after odd numbered trigger pulses from said source, means to control the operation of said microwave radar search system from the first of said series of pulses, means for deriving a unidirectional cyclic control voltage from said alternating current power source, means responsive to the second of said series of pulses and to said cyclic control voltage to select a single pulse of said second series during each cycle corresponding to a period of directivity of said antenna, means to control the operation of said recognition system from said selected pulse, and means for controlling the position of the display of signals from said recognition system on said indicator to distinguish the signals from each directional position of said antenna.

4. A circuit for coordinating and synchronizing the operation of a combined microwave radar search system and a directional radio recognition system comprising a source of timing pulses having a known repetition rate, an alternating current power source for switching the directivity of said recognition system, means responsive to pulses from said source of timing pulses for controlling the operation of said search system on alternate timing pulses, means responsive to voltage from said alternating current power source to derive a cyclic control voltage synchronous with said switching, means responsive to said control voltage and the remaining timing pulses from said source to select a single timing pulse during each switched position of directivity, and means whereby each of said selected pulses controls the operation of said recognition system.

5. A circuit for coordinating and synchronizing the operation of a combined microwave radar search system and a directional radio recognition system comprising a source of timing pulses having a known repetition rate, an alternating current power source for switching the directivity of said recognition system, means responsive to pulses from said source of timing pulses for controlling the operation of said search system on alternate timing pulses, means responsive to voltage from said alternating current power source to derive a cyclic control voltage synchronous with said switching, means responsive to said control voltage and the remaining timing pulses from said source to select a single timing pulse during each switched position of directivity, means whereby each of said selected pulses controls the operation of said recognition system, and means for rendering the receivers of each system operative only during the time interval between timing pulses following the pulsed operation of their respective transmitters.

6. A circuit for coordinating and synchronizing the operation of a combined microwave radar search system and a directional radio recognition system comprising a source of timing pulses having a known repetition rate, an alternating current power source for switching the directivity of said recognition system, means responsive to pulses from said source of timing pulses for controlling the operation of said search system on alternate timing pulses, means responsive to voltage from said alternating current power source to derive a cyclic control voltage synchronous with said switching means responsive to said control voltage and the remaining timing pulses of said source to select a single timing pulse during each switched position of directivity, means whereby each of said selected pulses controls the operation of said recognition system, means for rendering the receivers of each system operative only during the time interval between timing pulses following the pulsed operation of their respective transmitters, a cathode ray indicator common to both systems, and means for displacing the position of said ray to distinguish the signals from each directivity of said recognition system.

7. In a combined microwave radar search system and cooperating directional lobe-switched antenna radio recognition system using a common cathode ray indicator, a circuit for coordinating and synchronizing the operation of the components of the combined system comprising, a source of repetitive trigger voltage pulses, a frequency divider responsive to pulses from said source for producing an output square wave having positive portions of longer time duration than the negative portions, a derivative circuit responsive to the output of said frequency divider for producing negative pulses in time coincidence with odd pulses from said source and positive pulses preceding in time by a predetermined time interval the even pulses from said source, a first multivibrator responsive to positive pulses from said derivative circuit to produce a square output wave having a negative portion of double said predetermined time interval centered about said even pulses from said source, a first selector circuit responsive to pulses from said source and the output wave of said first multivibrator to reject even pulses from said source and to produce an output pulse in time coincidence with every odd pulse from said source, means responsive to the output pulse of said first selector circuit to produce an output square wave having a positive portion of time duration for the control of the operation of said microwave radar search system within the period of said pulse source, a source of alternating current power energizing the lobe switching mechanism of the directional antenna of said recognition system, means responsive to voltage from said alternating power source to produce a control voltage wave having a cycle for each antenna switching position, means responsive to time coincidence of positive pulses from said derivative circuit and to said control signal voltage wave to produce output pulses preceding by said predetermined time interval an even pulse from said source of trigger voltage pulses and coincident with a cycle of said control voltage, a second multivibrator responsive to the first coincident pulse from said last-named means to generate an output square wave having a time duration including subsequent pulses from said last-named means coincident with a single cycle of said control voltage, a second derivative circuit responsive to the output of said second multivibrator to produce single positive pulses in time coincidence with each cycle of said control voltage and preceding by said predetermined time interval an even pulse from said source of trigger voltage pulses, a third multivibrator responsive to positive pulses from said second derivative circuit to produce a square wave having a positive portion of double said predetermined time interval and centered on an even pulse from said source of trigger pulses for each cycle of said control voltage, a second selector circuit responsive to the output of said third multivibrator and pulses from said source of trigger voltage pulses to reject odd pulses from said source and to produce one output pulse in time coincidence with an even pulse from said source during each cycle of said control voltage, means applying the output pulses from said second selector circuit to energize said recognition system transmitter, a fourth multivibrator responsive to the output pulses of said second selector circuit to generate an output square wave having a positive portion time duration less than the period of said trigger pulses, means applying the output square wave of said fourth multivibrator to control the operation of the receiver of said recognition system, a fifth multivibrator operating as a scale of two frequency divider responsive to output pulses from said third multivibrator to generate a square wave having a positive portion in time coincidence with alternate output pulses of said fourth multivibrator, and means applying the output of said fifth multivibrator for the horizontal displacement of alternate signals from said recognition system for ease of matching signals from each lobe of said recognition system antenna.

References Cited in the file of this patent

UNITED STATES PATENTS

| | | |
|---|---|---|
| 2,515,178 | Barchok | July 18, 1950 |
| 2,540,087 | Barchok et al. | Feb. 6, 1951 |
| 2,586,888 | Varela | Feb. 26, 1952 |